Figure 1:
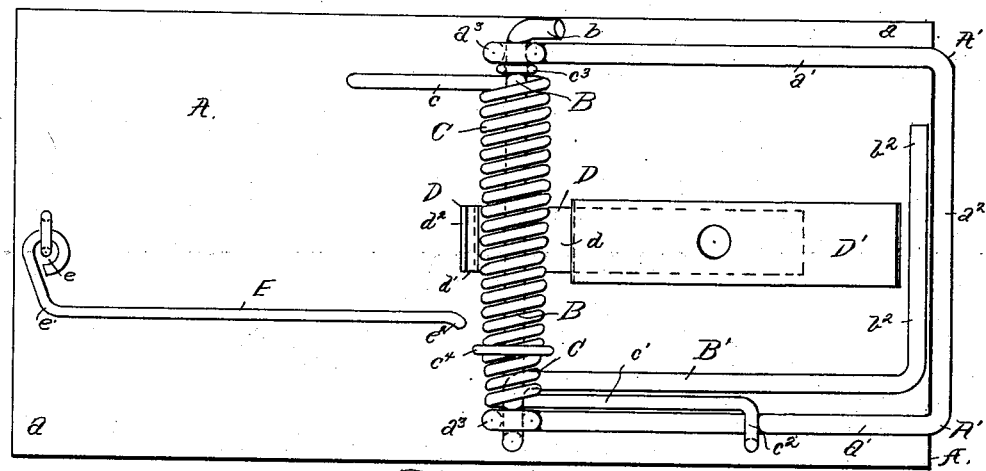

No. 744,379. PATENTED NOV. 17, 1903.
J. M. MAST.
ANIMAL TRAP.
APPLICATION FILED OCT. 30, 1899.
NO MODEL.
2 SHEETS—SHEET 1.

WITNESSES:
Charles M. Knort,
Milton B. Schley

INVENTOR
John M. Mast.
BY
Daniel H. Herr,
Attorney

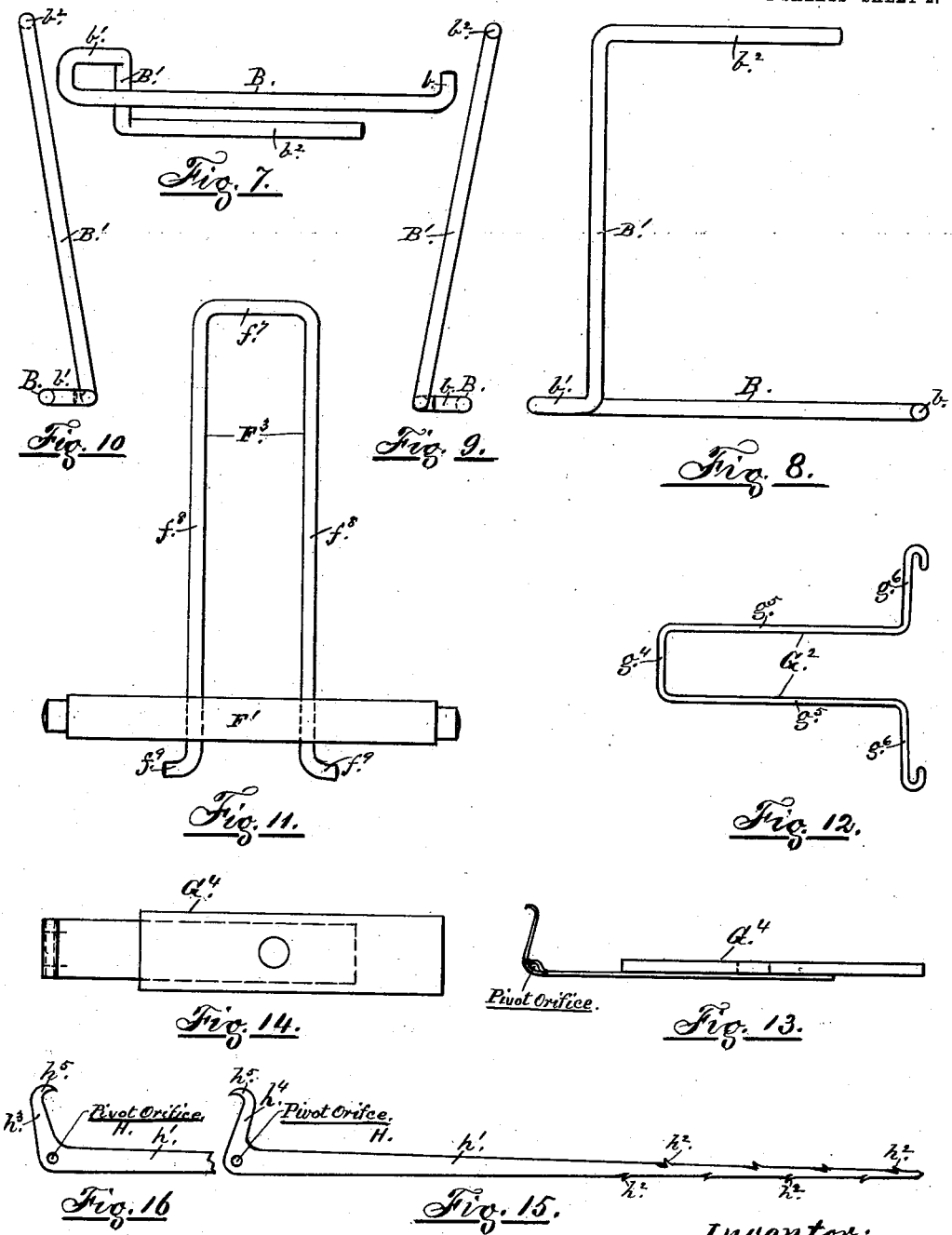

No. 744,379. Patented November 17, 1903.

UNITED STATES PATENT OFFICE.

JOHN M. MAST, OF LANCASTER, PENNSYLVANIA, ASSIGNOR TO J. M. MAST MANUFACTURING COMPANY, OF LITITZ, PENNSYLVANIA.

ANIMAL-TRAP.

SPECIFICATION forming part of Letters Patent No. 744,379, dated November 17, 1903.

Application filed October 30, 1899. Serial No. 735,148. (No model.)

*To all whom it may concern:*

Be it known that I, JOHN M. MAST, a citizen of the United States, residing at Lancaster, in the county of Lancaster and State of Pennsylvania, have invented certain new and useful Improvements in Animal-Traps, whereby said traps may be set with perfect safety to the operator; and I do hereby declare the following to be a full, clear, and exact description of the invention, such as will enable others skilled in the art to which it appertains to make and use the same.

This invention relates to improvements in an animal-trap of that class in which a spring-actuated striker is raised by depressing the outer end of a lever or arm rigid with a rotatable shaft supporting other elements and which is adapted to be secured or held in depressed position by a treadle or trigger passing underneath said shaft in adjusting or setting said trap and to be released by tripping said treadle or trigger, springing said trap, said lever, with the shaft and said treadle or trigger, constituting the chief features of the invention.

The object of the invention is to provide means whereby traps of this class may be readily set or adjusted with absolute safety to the person attending thereto, avoiding the liability of having his fingers caught or injured by the striker when it is prematurely or accidentally freed or released.

The elements of the invention will severally and at large appear in the following description, and they will be separately and collectively pointed out in the appended claims.

The purposes of the invention are attained by the devices and means illustrated in the accompanying drawings, similar reference characters designating like parts throughout the several views, in which—

Figures 3, 6:
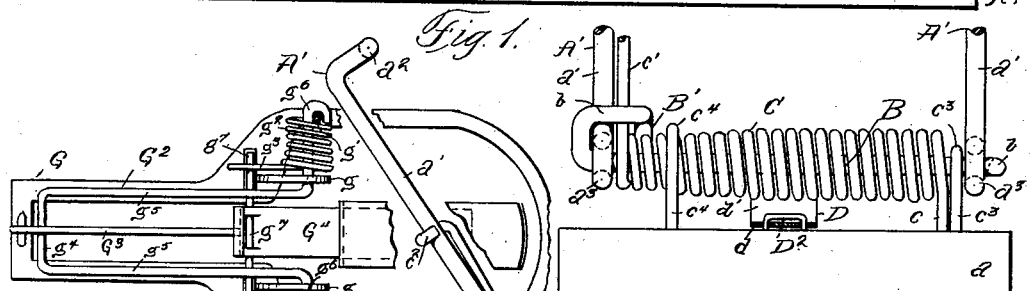
Figure 2:
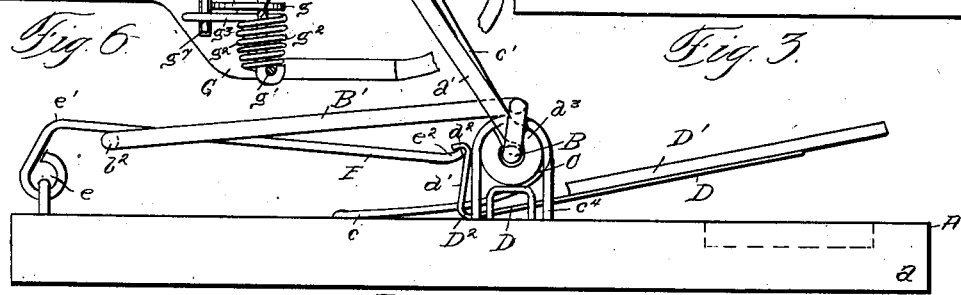
Figures 4, 5:
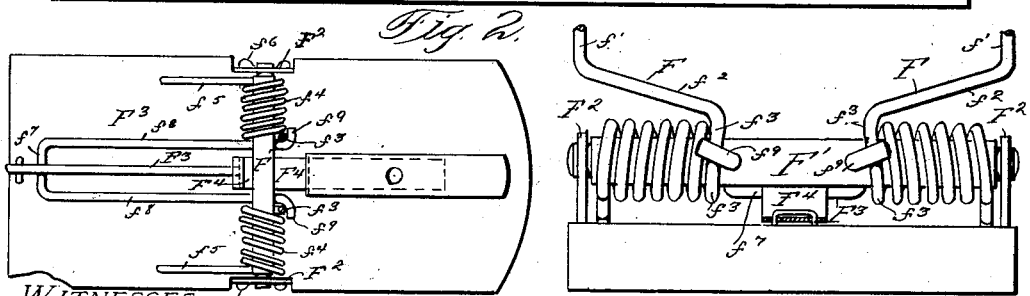

Figure 1 is a plan of a trap embodying the elements of the invention, the trap being sprung. Fig. 2 is a side elevation of the same, the trap being set. Fig. 3 is a right-hand end view of Fig. 2 with the upper portions of the striker and actuating-spring arm removed, the trigger or treadle appearing in section through the pivot-joint. Figs. 4, 5, and 6 show modifications of the striker, spring-adjusting lever, and supporting-shaft used in the construction of such traps. Figs. 7, 8, 9, 10, 11, and 12 are views showing in detail the several lever-arms in combination with their respective shafts. Fig. 13 is a detail side elevation of the trigger shown in Fig. 6. Fig. 14 is a top plan view of the same, and Figs. 15 and 16 are detail views of modifications of the trigger.

As shown in Figs. 1, 2, and 3 of the drawings, a trap A, embodying the elements of the invention, comprises a practically rectangular body or base $a$, of approved thickness, on which is arranged a practically U-shaped striker A', having two parallel side bars $a'$ $a'$ with the forward ends joined by a cross-bar $a^2$ depending over the forward edge of said base, being in close contact therewith when said trap is sprung, and said side bars have their rearward or free ends bent over, so as to form eyes $a^3$ for pivoting the striker in place. Through the eyes $a^3$ is passed a rod or shaft B, having one end turned over into an L-shaped hook $b$ to prevent said end from slipping through the adjacent eye and the other end turned over a prescribed distance, forming an introverted fold $b'$, embracing the adjacent striker-bar $a'$ where said end is turned over at an angle of ninety degrees with the shaft B and a vertically-disposed acute angle with the outer limb or curved end of the fold $b'$, constituting the lever-arm B', of the required length, where it is continued at an angle of ninety degrees into the branch $b^2$, whereby said lever-arm is raised and depressed to lift the striker and set the trap, the whole constituting the preferred form of the lever-arm and the attached shaft of the invention. (See Figs. 7, 8, 9, and 10 and also Figs. 1, 2, and 3.)

Surrounding the shaft B is coiled a spring C, having one end extending into an arm $c$, passing underneath said shaft with its extremity resting on top of the base $a$, and the other end extending into an arm $c'$, passing underneath the shaft between it and the introverted arm of the fold $b'$, with its extremity bent upwardly and outwardly, forming a curve $c^2$, engaging on top of the adjacent striker-bar $a'$, the shaft being pivoted in place by a staple $c^3$, embracing said shaft and driven into the base $a$, and the other end by a staple $c^4$, embracing the coiled spring C and also driven into said base, and a staple $c^5$, placed underneath the spring at this point and likewise driven into the base, serves to keep the spring and shaft upwardly in place here, while the resiliency of the arm $c$ serves to perform the same functions at the other end, determining a space underneath said spring and shaft for the pivoting and working of the setting and springing trigger, yet to be described.

On the longitudinal center line of the base and the space therebetween and the spring is arranged the trigger D, comprising a strip $d$, preferably of strap metal of improved dimensions, having its rearward end $d'$ abruptly turned up, forming an acute angle, with its upper end turned out rearwardly, forming a lip or latch hook $d^2$, adapted to hold the forward end of the lever-holding arm in setting or adjusting the striker and having secured, preferably on top, to its forward end a body or block D', constituting a platform or treadle whereby said trigger may be depressed, and the trigger is preferably pivoted in place to the base of the trap by means of a staple $D^2$, having its prongs or arms passing through orifices in the strip immediately forward of its upturned end and driven into said base, and the trigger is so arranged that its platform or treadle will lie on the base $a$ when the trap is sprung. This is the preferred form of the treadle or trigger passing underneath the shaft and spring and rearward thereof, pivoted in place to the upper surface of said base. (See Figs. 1, 2, and 3.)

In the rearward portion of the trap on the longitudinal center line of its base $a$ is arranged the striker-lever-holding arm E, of the required dimensions, being bent and shaped as shown, having at its rearward end an eye $e$, through which a staple driven into the base serves to pivot said arm thereto, and the arm having a crook $e'$ passes above the branch $b^2$ of the lever-arm B', with its forward end turned up into a crook $e^2$ to engage under the lip-hook $d^2$ of the trigger D, serves to hold said lever-arm in depressed position, adjusting the striker and setting the trap.

In the modification illustrated in Figs. 4 and 5 the striker F has its parallel side bars $f'\,f'$ curved inward a prescribed distance, forming branches $f^2\,f^2$, thence curved outward, forming short parallel side bars $f^3\,f^3$, which are continued into helical coils $f^4\,f^4$, arranged crosswise of the base and having their axes in the same straight line perpendicular to the action or motion of the striker, with their outer ends continued rearwardly into parallel side arms $f^5\,f^5$, resting on top of the base of the trap, forming the striker and the actuating-spring in one piece. Through the axial centers of these coils is passed a shaft F', having its extremities journaled in bearings in the upper ends of posts $F^2$, rigidly secured to the sides of the base, as by screws $f^6$. The striker lifting and adjusting lever $F^3$ in this instance is a fold or loop of wire of approved gage, comprising a rear end bar $f^7$, joining two parallel side bars $f^8\,f^8$, having their forward ends passing through the shaft F' and rigidly secured thereto, as by brazing, with their extremities turned sloping outward over the parallel bars $f^3$, appearing in section, forming folds or loops $f^9\,f^9$, embracing said bars $f^3$, whereby the striker is raised or lifted in adjustment, while the lever-holding arm $F^3$ and the trigger $F^4$ are precisely similar in all respects to those described and shown in the previous construction. The shaft F' and the attached lever-arm $F^3$ are best shown detached from the trap in the plan illustrated in Fig. 11.

In Fig. 6 of the drawings is illustrated a trap having a skeleton frame or base comprising a marginal rim G, preferably of cast metal, and having integral therewith upwardly-projecting lugs or standards $g\,g$, with hooks at their upper ends forming shaft-bearings in the under edge openings or recesses of said hooks. The striker, the forward portion of which is broken off, has its side bars $g'\,g'$ continued to the shaft, where said side bars are turned over into helical coils $g^2\,g^2$, extending inwardly toward said standards and in close proximity to their outer faces, where the ends of said coils are continued in parallel side bars or arms $g^3\,g^3$, extending a prescribed distance rearward and resting on top of said framework. The lifting and depressing lever-arm $G^2$ in this modification is also a fold consisting of a cross-bar $g^4$, turned over and continued in two parallel side bars $g^5\,g^5$ of approved length, with their free ends turning perpendicularly outward into the branches $g^6\,g^6$, engaging in the hook-bearings of the standards, passing along their axes through the helical coils $g^2\,g^2$ and having their extremities turned over to embrace the bars $g'\,g'$ of the striker constitute the lifting and depressing lever combined with the supporting-shaft adapted to raise the striker in adjusting or setting the trap. The lever-holding arm $G^3$ and the trigger $G^4$ are practically the same as those before shown and described, except that the latter is pivoted on a rod $g^7$, resting in recesses formed in the top of the skeleton frame and held in place by the spring-arms $g^3\,g^3$ passing over them and resting thereon. This lever-arm, with its combined two-branched shaft, is best shown in the detached plan illustrated in Fig. 12, while the trigger $G^4$ is best shown in the two views illustrated in Figs. 13 and 14.

It will be noticed that in place of the trigger and striking-lever-holding arm (shown in Figs. 1 to 6, inclusive) the modified trigger H, provided on its forward end with projections $h^2$, may be substituted. This trigger is adapted to be pivoted at its rear end to the base and so arranged that the lip-hook $h^5$ at the upper end of either upwardly-projecting arm $h^3$ or $h^4$ can be used to set the trap.

In Fig. 2 dotted lines indicate in side elevation the positions of two triggers H, either being pivoted to the base $a$ in the rearward portion and on the longitudinal center line thereof, as by a staple $h$, and having their shafts $h'$, of the required dimensions, extending forwardly through the space underneath the spring or shaft to near the forward end of said base-block, where the forward ends of said shafts are provided with edge cuts or tines $h^2$, holding the bait thereto, while on their respective rearward ends above the pivot are indicated the positions of two upwardly-projecting arms $h^3 h^4$, one being behind and the other before the branch $b^2$ of the lever-arm B', each arm having at its upper end an overlying lip or latch hook $h^5$, embracing said branch and adapted to be used in adjusting the striker or setting the trap, either of which triggers may be used in the construction of the trap, according as the forward end of the trigger is to be depressed or lifted to spring said trap. The trigger H, having the upwardly-projecting rear end arm $h^4$, with the rearwardly-engaging lip-hook $h^5$ at its upper end, is best shown in Fig. 15, while Fig. 16 illustrates in part a similar trigger, having at its rearward end the upwardly-projecting arm $h^3$, with the forwardly-engaging lip-hook $h^5$ at the upper end thereof, either of which triggers, through its pivot-orifice shown, may be pivoted in place by the staple $h$, (shown by dotted lines in Fig. 2;) but the trigger D', as well as the lever-holding arm E, will then be omitted.

The following patents, Nos. 12,892 and 13,483, dated May 22 and August 28, 1855, issued to Lucien B. Bradley for an improved rat-trap and an improvement in a trap for catching animals, No. 391,118, dated October 16, 1888, issued to William H. Castle, for an animal-trap, and No. 481,707, dated August 30, 1892, issued to Chauncey B. Trumble, for an animal-trap, all show spring-actuated jaws or strikers provided with means for raising and holding said strikers and releasing the same and setting and springing said traps. No claims are therefore made, broadly, to the elements hereinbefore shown and described; but What is considered new, and desired to be secured by Letters Patent, is—

1. In an animal-trap, the combination of a base, of an oscillating shaft journaled thereon, a striker journaled on said shaft, a spring mounted on said shaft and having its one end bearing on the base, and its other end connected with said striker, a lever connected to said shaft, said lever being looped around and adapted to raise said striker, and a trigger adapted to engage said lever, substantially as described.

2. In an animal-trap, the combination of a base, a shaft mounted thereon, a striker, a spring mounted on said shaft and connected with said striker, means for rocking said shaft, loops connected to said shaft for raising said striker, and a trigger adapted to engage said means, substantially as described.

3. In an animal-trap, the combination of a base, a shaft journaled thereon, a striker having its ends looped around said shaft, spring means on said shaft for depressing said striker, a lever looped around said striker adapted to raise the same and to rock said shaft, and a trigger adapted to engage said lever, substantially as described.

In testimony whereof I affix my signature in presence of two witnesses.

JOHN M. MAST.

Witnesses:
CHAS. E. LONG,
DANL. H. HERR.